Patented Jan. 9, 1923.

1,441,219

UNITED STATES PATENT OFFICE.

ALFRED EHRENREICH, OF NEW YORK, AND ALLEN ROGERS, OF BROOKLYN, NEW YORK, ASSIGNORS TO THE OCEAN LEATHER COMPANY, OF NEW YORK, N. Y., A CORPORATION OF DELAWARE.

PROCESS FOR THE MANUFACTURE OF FERTILIZER STOCK.

No Drawing.   Application filed September 11, 1920.   Serial No. 409,503.

*To all whom it may concern:*

Be it known that we, ALFRED EHRENREICH, a citizen of Czecho-Slovakia, and ALLEN ROGERS, a citizen of United States, residing at New York, State of New York, and Brooklyn, State of New York, have invented a certain new and useful Improvement in Processes for the Manufacture of Fertilizer Stock, of which the following is a specification, reference being had therein to the accompanying drawing.

This invention relates to improvements in processes for the manufacture of fertilizer stock, and pertains more particularly to the process of treating fish scrap and the like.

The present invention has for its objects primarily, among others, to treat the material in a raw state and convert it into a commercial product without the necessity of going through the cooking operation, which has heretofore been considered necessary.

The present method is particularly applicable to scrap fish ordinarily used for fertilizer purposes and differs materially from known processes in that we start out with the raw material whereas it is the usual practice to first cook the material before it enters the drier, the fish being first cooked for the removal of the oil. Our process effects a material saving in time, as well as cost and the product which we obtain as the result of our process has been found to be far superior to the products resulting from the old processes.

Other objects and advantages of the invention will hereinafter appear and the novel features thereof will be particularly pointed out in the appended claims.

Our process is carried out as follows:—

We first remove the hide and liver from the body of the fish, such, for instance, as shark and the like, to the treatment of which our process is especially applicable, and then immediately transfer the carcasses to the hopper of a specially designed disintegrator, such, for instance, as a modified form of the "Sturtevant hammer mill", the hammer being made sharp instead of dull and the plates being quite widely separated rather than close together. By means of this disintegrator the wet, uncooked material is converted into the form of a semiplastic mass or paste. From this mill, the ground material is carried to the top of the rotary drier by any suitable means, such, for instance, as an endless conveyor. The wet material, as it enters the hot end of the rotary drier, is sprinkled with concentrated sulphuric acid, the purpose being to produce an acid condition in the material in order that any ammonia formed during the drying should not be lost. As the dried material leaves the rotary drier, it is again ground in any suitable manner, as in a regular hammer mill, and is then ready for shipment.

The process hereinbefore described may sometimes be applied to scrap fish of the fat bearing nature, after the bodies have been cooked for the removal of the oil, the concentrated sulphuric acid being sprinkled upon the material as it enters the hot end of the rotary drier.

The advantage gained by sprinkling acid on the fish scrap is that the handling of the fish scrap is much simpler when it comes from the crusher than it would be if placed in a pile and sprinkled with acid. Subsequent difficulty is also encountered in turning over the scrap when the acid is applied to the material in that condition. By our process we are enabled to sprinkle the concentrated acid over the fish scrap as it enters the drier, thus giving uniform distribution, and, being on the surface, it readily combines with any ammonia that may have been set free.

What is claimed as new is:—

1. The process of manufacturing fertilizer stock, which consists in disintegrating the raw uncooked fish, sprinkling the same with an acid and subsequently drying.

2. The process of manufacturing fertilizer stock, which consists in disintegrating the raw uncooked fish, sprinkling the same with an acid and subsequently drying, and then grinding the same.

3. The process of manufacturing fertilizer stock, which consists in disintegrating the raw uncooked fish without cooking, conveying the wet material to a drier, and sprinkling the same with concentrated sulphuric acid before it is dried to produce an acid condition in the material.

4. The process of manufacturing fertilizer stock, which consists in disintegrating the raw uncooked fish without cooking, conveying the wet material to a drier, sprinkling the same with concentrated sulphuric acid before it is dried to produce an acid condition in the material, and subsequently grinding.

5. The process of manufacturing fertilizer stock from fish, which consists in disintegrating the raw material without cooking, conveying the wet material to a drier and sprinkling the wet material as it enters the drier with concentrated sulphuric acid, then drying and afterward grinding to produce a dry powdered substance.

In testimony whereof we affix our signatures in the presence of two witnesses.

ALFRED EHRENREICH.
ALLEN ROGERS.

Witnesses:
A. F. GREENBERG,
O. D. SPAHR.